United States Patent
Hanano

(10) Patent No.: US 8,649,045 B2
(45) Date of Patent: Feb. 11, 2014

(54) INFORMATION PROCESSING APPARATUS, PROCESSING METHOD THEREOF, AND COMPUTER-READABLE STORAGE MEDIUM

(75) Inventor: Hideki Hanano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 969 days.

(21) Appl. No.: 12/761,988

(22) Filed: Apr. 16, 2010

(65) Prior Publication Data
US 2010/0296120 A1    Nov. 25, 2010

(30) Foreign Application Priority Data
May 22, 2009  (JP) ................................. 2009-124724

(51) Int. Cl.
*G06K 15/00*    (2006.01)
(52) U.S. Cl.
USPC ........................................ 358/1.15; 358/1.16
(58) Field of Classification Search
None
See application file for complete search history.

(56) References Cited

U.S. PATENT DOCUMENTS

2001/0025326 A1\*  9/2001  Kizaki ........................... 710/100
2003/0172187 A1\*  9/2003  Wu et al. ....................... 709/247

FOREIGN PATENT DOCUMENTS

JP  2003-046734 A   2/2003
JP  2003-304354 A   10/2003

\* cited by examiner

*Primary Examiner* — Benny Q Tieu
*Assistant Examiner* — Lennin Rodriguezgonzalez
(74) *Attorney, Agent, or Firm* — Fitzpatrick, Cella, Harper & Scinto

(57) ABSTRACT

The present invention provides an information processing apparatus that acquires image data from an image supply apparatus, and that transfers the acquired image data to an application, including: a selection unit configured to select a transfer mode when transferring the image data to the application; a first transfer control unit configured to transfer the image data to the application according to a TWAIN standard; a second transfer control unit configured to transfer an image file created based on the image data while maintaining a compression format or a non-compression format, to the application; and a transfer control unit configured to control the transfer using at least one of the first transfer control unit and the second transfer control unit based on the transfer mode selected by the selection unit.

18 Claims, 6 Drawing Sheets

FIG. 6

```
SCANNING IS COMPLETED AND
THE FOLLOWING FILES ARE CREATED.

NUMBER OF FILES : 5

SAVED FILES :
   ~/Pictures/scan1.jpeg
   ~/Pictures/scan2.jpeg
   ~/Pictures/scan3.jpeg
   ~/Pictures/scan4.jpeg
   ~/Pictures/scan5.jpeg
```

INFORMATION PROCESSING APPARATUS, PROCESSING METHOD THEREOF, AND COMPUTER-READABLE STORAGE MEDIUM

BACKGROUND OF THE INVENTION

1. Field of the Invention

The present invention relates to an information processing apparatus, a processing method thereof, and a computer-readable storage medium.

2. Description of the Related Art

Drivers that control peripheral apparatus connected to information processing apparatus, and applications that receive image data from drivers and save the image data as files are known. These drivers, applications, and the like have, for example, a function with which image data scanned by an image scanning apparatus (for example, a scanner, a multi-function printer, etc.) is transferred to and saved in an information processing apparatus.

Ordinarily, drivers and applications supporting a TWAIN (tool without an interesting name) standard are known. For example, Japanese Patent Laid-Open No. 2003-304354 discloses a technique in which an application supporting the TWAIN standard (hereinafter, referred to as a "TWAIN application") starts a driver supporting the TWAIN standard (hereinafter, referred to as a "TWAIN driver"), to obtain desired scanning settings and the like of peripheral apparatus. Furthermore, for example, Japanese Patent Laid-Open No. 2003-046734 discloses a technique in which a TWAIN application that has acquired image data saves the image data as an image file, and transfers the image file to another application such as email software without using TWAIN.

Ordinarily, in image scanning apparatus, in order to increase the speed of communication, scanned image data is compressed, and transmitted to an information processing apparatus. As data transfer methods of the TWAIN standard used at that time, a memory transfer method in which non-compressed image data is transferred, and a file transfer method in which data is saved as a file regardless of whether the data is in a non-compression format or in a compression format and transferred are defined.

In a TWAIN driver, in the case where compressed image data acquired from an image scanning apparatus is transferred to an application supporting the TWAIN, if the data transfer method is the file transfer method, an image file is created based on the compressed image data, and stored at a designated location in an information processing apparatus. On the other hand, if the data transfer method is the memory transfer method, the compressed image data is converted into non-compressed image data, and the data is transferred via a memory on an information processing apparatus. Accordingly, in the case of the memory transfer method, compressed image data acquired from the image scanning apparatus is converted into non-compressed image data, and, thus, if the compressed image data is configured by lossy compression, such as JPEG, deterioration of image quality occurs.

In order to avoid deterioration of image quality occurring during transfer using the memory transfer method in this manner, a TWAIN application supporting the file transfer method may be used. However, a TWAIN application that a user wants to use may not support the file transfer method. In this case, a user has to create an image file using a TWAIN application supporting a file transfer method, and transfer the image file without using a TWAIN data transfer method to the TWAIN application that the user originally wanted to use, and, thus, the usability for the user is poor.

SUMMARY OF THE INVENTION

The present invention provides a technique that can avoid deterioration of image quality caused by a compression process or a decompression process, without complicated operations, when transferring image data to an application.

According to a first aspect of the present invention, there is provided an information processing apparatus that acquires image data from an image supply apparatus, and that transfers the acquired image data to an application, comprising: a selection unit configured to select a transfer mode when transferring the image data to the application; a first transfer control unit configured to transfer the image data to the application according to a TWAIN standard; a second transfer control unit configured to transfer an image file created based on the image data while maintaining a compression format or a non-compression format, to the application; and a transfer control unit configured to control the transfer using at least one of the first transfer control unit and the second transfer control unit based on the transfer mode selected by the selection unit.

According to a second aspect of the present invention, there is provided a processing method of an information processing apparatus that acquires image data from an image supply apparatus, and that transfers the acquired image data to an application, comprising: selecting a transfer mode when transferring the image data to the application using a selection unit; transferring the image data to the application according to a TWAIN standard using a first transfer control unit; transferring an image file created based on the image data while maintaining a compression format or a non-compression format, to the application using a second transfer control unit; and controlling the transfer using at least one of the first transfer control unit and the second transfer control unit based on the transfer mode selected by the selection unit, using a transfer control unit.

Further features of the present invention will be apparent from the following description of exemplary embodiments with reference to the attached drawings.

BRIEF DESCRIPTION OF THE DRAWINGS

FIG. 6 is a diagram showing an example of a UI screen.

DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Embodiment 1

Figure 1:
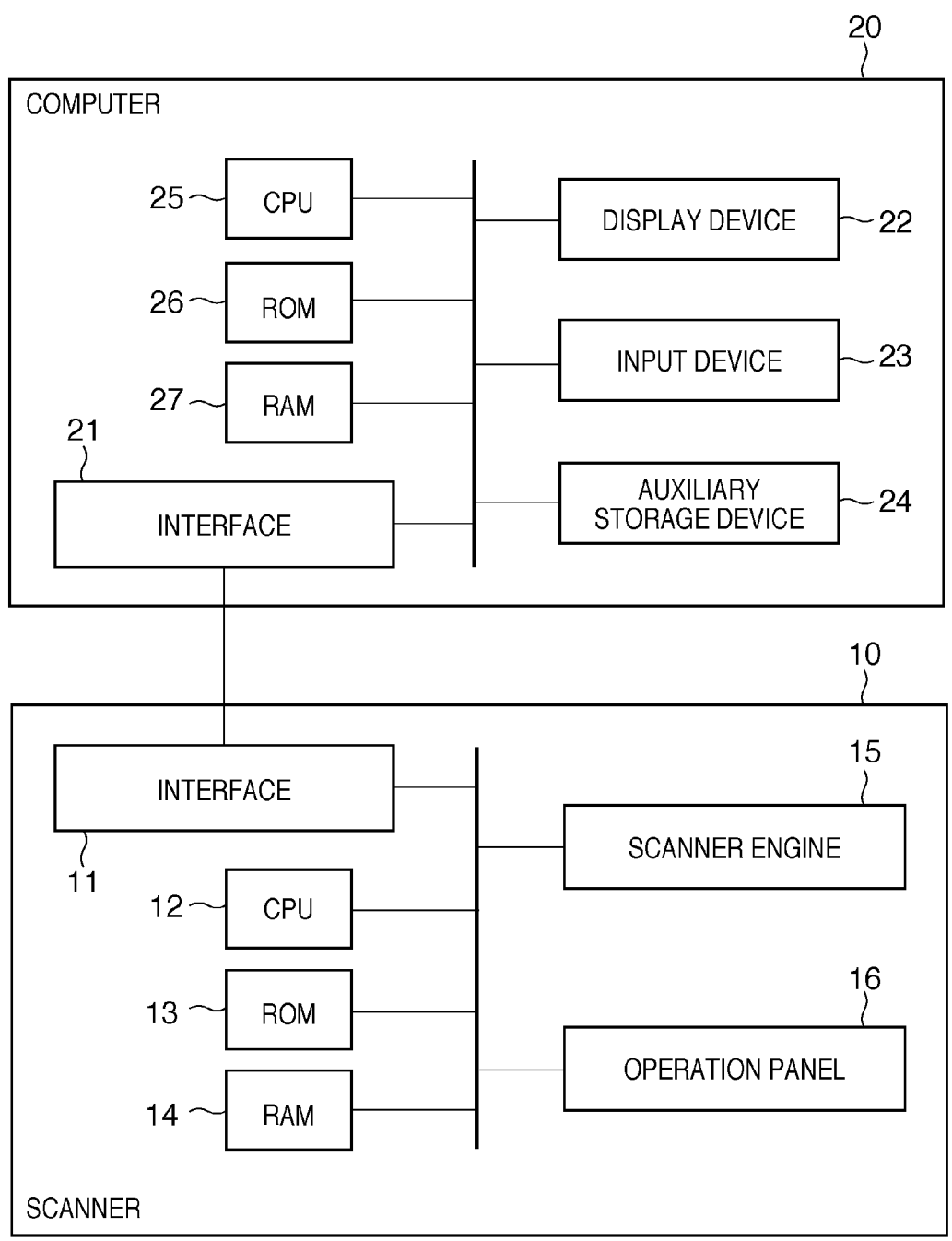
FIG. 1 is a diagram showing an example of the configuration of an image scanning system according to an embodiment of the present invention.

FIG. 1 is a diagram showing an example of the configuration of an image scanning system in which an information processing apparatus according to an embodiment of the present invention is disposed.

In this image scanning system, a scanner 10 and a computer 20 are connected via a network or the like. Here, the scanner 10 and the computer 20 need only be able to communicate with each other, and do not necessarily have to be connected to each other via a network. Furthermore, the connecting method may be wireless or may be wired.

The computer 20 functions as an information processing apparatus that transmits various control commands that can be interpreted by the scanner 10, and that receives image data scanned by the scanner 10 according to the control commands. The scanner 10 functions as an image supply apparatus that scans an original document and creates image data under the control of the computer 20, and that transmits the created image data to the computer 20. Here, the image supply apparatus may be any apparatus that supplies image data to the computer 20, such as a digital camera or a PDA as well as the scanner 10.

Here, the computer 20 has a hardware configuration that includes an interface 21, a display device 22, an input device 23, an auxiliary storage device 24, a CPU 25, a ROM 26, and a RAM 27.

The interface 21 controls exchange of data with peripheral apparatus such as the scanner 10. The display device 22 is realized, for example, as a display or the like, and displays various UI screens. The input device 23 is realized, for example, as a keyboard, a pointing device, or the like, and inputs an instruction from a user to the apparatus. The auxiliary storage device 24 is realized as an internal or external hard disk or the like, and stores various types of information. The ROM 26 stores various programs and the like, and the RAM 27 temporarily stores data, programs, and the like. The CPU 25 performs overall control of the computer 20 using the RAM 27 as a working area according to programs read from the ROM 26.

The scanner 10 is, for example, a color image scanner according to a CCD method. The CCD color image scanner scans a CCD line sensor (not shown) to optically scan an original document placed on an original document stage, and converts the read data into image data.

Here, the scanner 10 has a hardware configuration that includes an interface 11, a CPU 12, a ROM 13, a RAM 14, a scanner engine 15, and an operation panel 16.

The interface 11 controls exchange of data with apparatus such as the computer 20. The ROM 13 stores various programs and the like, and the RAM 14 temporarily stores data, programs, and the like. The CPU 12 performs overall control of the scanner 10 using the RAM 14 as a working area according to programs read from the ROM 13. The scanner engine 15 controls an original document scanning unit and the like including a CCD image sensor. The operation panel 16 is configured from a display unit that displays an apparatus state, a menu, and the like, and an input unit that inputs an instruction from a user to the apparatus.

Figure 2:
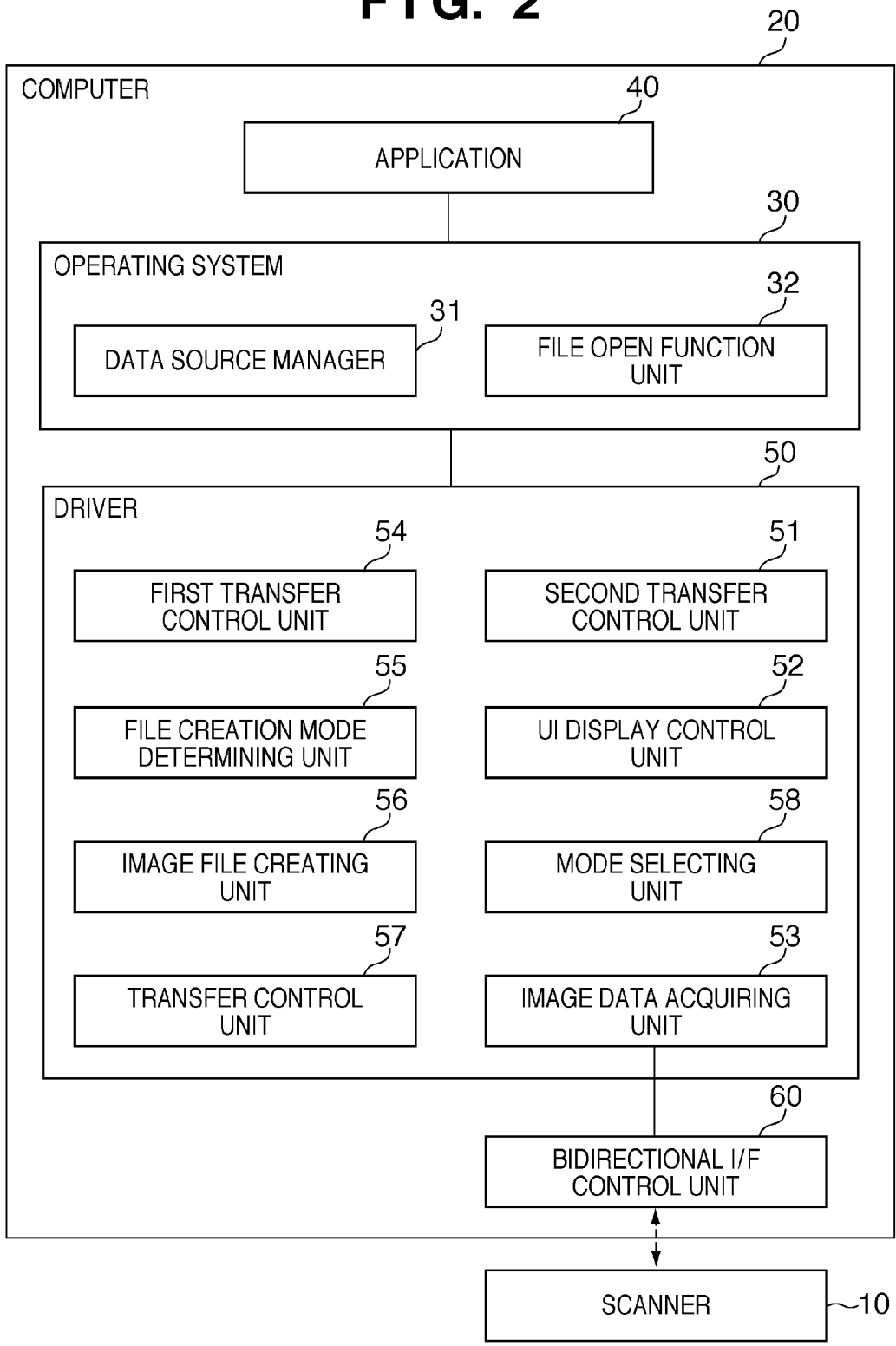
FIG. 2 is a diagram showing an example of a functional configuration of a computer 20 shown in FIG. 1.

Next, an example of a functional configuration in the computer 20 shown in FIG. 1 will be described with reference to FIG. 2. Here, various functional units are realized, for example, by the CPU 25 reading and executing programs stored (in other words, installed) in the ROM 26 or the auxiliary storage device 24 using the RAM 27 as a working area.

The functional configuration realized in the computer 20 is roughly divided into an application 40 that supports a predetermined image communication standard (TWAIN standard, in this embodiment), an operating system 30, and a driver 50 that supports the TWAIN standard.

Here, the TWAIN standard will be briefly described. In the TWAIN standard, transfer methods including a memory transfer method and a file transfer method are defined. In the memory transfer method, in the case where compressed image data is to be transferred, the image data is transferred after being converted into a non-compression format. In the file transfer method, an image file based on the image data is created regardless of whether the image data is in a non-compression format or in a compression format (in other words, while maintaining an original compression or non-compression format of the image data), and transferred.

The operating system 30 provides functions that are basically provided in many applications, such as an input and output function that controls output to the display device 22, input from the input device 23, and the like, and a memory management function of the auxiliary storage device 24, and manages the entire computer.

Furthermore, the operating system 30 includes a data source manager 31 that controls the application 40 and the driver 50. The data source manager 31 is, for example, an API (application program interface) that realizes communication between the application 40 and the driver 50 according to the TWAIN standard.

Furthermore, the operating system 30 includes a file open function unit 32. The file open function unit 32 is realized as an API providing a function that designates a file and an application, and opens the file using the application (hereinafter, referred to as a "file open function").

The application 40 is software that processes image data. For example, this application acquires image data from a data source supporting the TWAIN standard via the data source manager 31. This application performs an image process on the image data, and then renders data to the display device 22, or stores data as an image file in the auxiliary storage device 24. Examples of the application 40 include software that edits image data, software that performs character recognition in image data, and the like.

The driver 50, for example, transmits commands for controlling the scanner 10, and receives image data. Here, the driver transmits commands and receives image data, via a bidirectional interface control unit 60.

Here, the driver 50 includes a first transfer control unit 54, a second transfer control unit 51, a transfer control unit 57, a UI display control unit 52, an image data acquiring unit 53, a file creation mode determining unit 55, an image file creating unit 56, and a mode selecting unit 58.

The first transfer control unit 54 transfers data from the driver 50 to the application 40 according to the TWAIN standard. This transfer is performed via the data source manager 31.

The second transfer control unit 51 transfers data from the driver 50 to the application 40 using the function (API) of the operating system 30. More specifically, an image file is transferred to the application 40 using the file open function (the file open function unit 32) of the operating system 30. Here, depending on the operating system 30, it is also possible to simultaneously designate a plurality of image files and display image windows.

Figure 3:
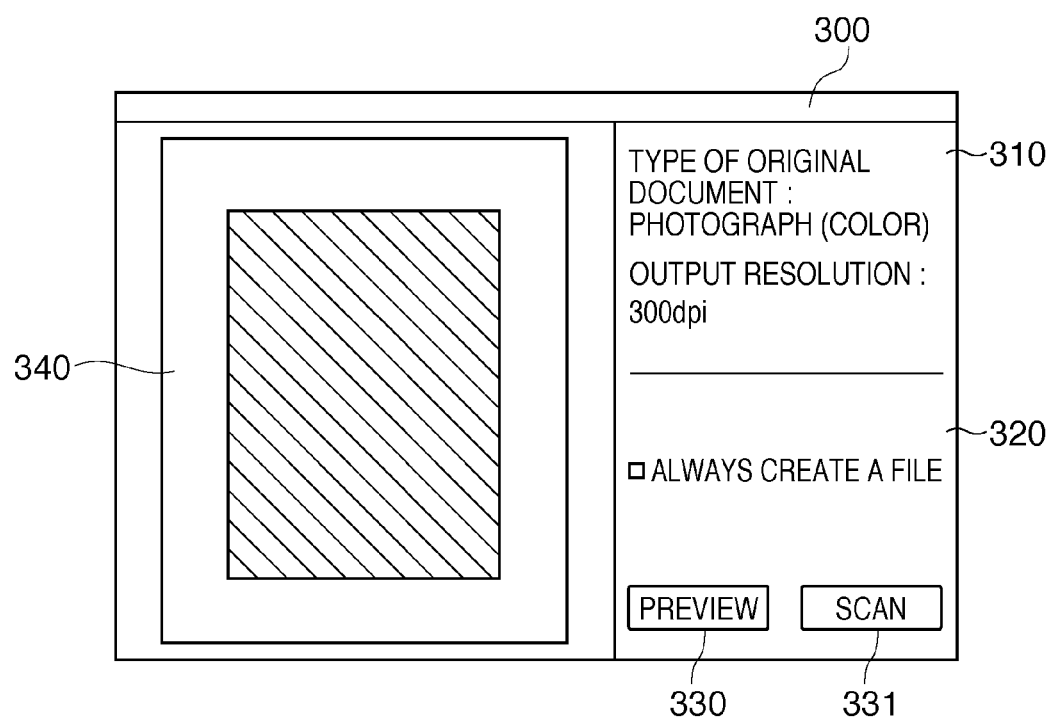
FIG. 3 is a diagram showing an example of a UI screen.

The UI display control unit 52 controls display of various UI screens on the display device 22. For example, in the case where an instruction to display a UI screen is given from the first transfer control unit 54, the UI display control unit 52 controls display of a dialog box shown in FIG. 3.

Here, in the case where the user presses a "preview" button in a dialog box 300, the entire face of an original document placed on the original document stage of the scanner 10 is scanned at a low resolution shown in, for example, region 310, and an original document image is displayed in a preview area 340. Furthermore, in the case where the user designates an original document image displayed in the preview area 340 with a pointing device or the like, and presses a "scan" button 331, the scanner 10 performs a scanning operation (actual scanning) Furthermore, in the case where the user selects a check box "always create a file" in a mode designation area 320, a file creation mode is set. When the file creation mode is set, the driver 50 gives, for example, the scanner 10 a request to acquire image data in a compression format (for example, JPEG), and acquires image data scanned by the scanner 10 in a compression format. Then, the driver 50 creates an image file based on the compressed image data, and transfers the image data to the application 40. In the case where the file creation mode is set, the image file is created while maintaining the format of the image data regardless of whether the image data is in a compression format or in a non-compression format.

The image data acquiring unit 53 acquires image data scanned by the scanner 10 via the bidirectional interface control unit 60. Furthermore, the image data acquiring unit 53 stores acquired image data in a memory (for example, the RAM 27). When acquiring image data, the image data acquiring unit 53 designates compression or non-compression of the image data, to the scanner 10. Here, the image data acquired from the scanner 10 may be, for example, JPEG compressed image data due to a data converting process of the scanner 10.

The mode selecting unit 58 selects a transfer mode when transferring image data to the application 40. This selection is made based on an instruction from the user via the input device 23. The file creation mode determining unit 55 determines the transfer mode selected by the mode selecting unit 58. More specifically, it is determined whether or not a file creation mode is set.

The image file creating unit 56 creates an image file. For example, the image data acquired by the image data acquiring unit 53 is stored in a memory as an image file in a file format such as JPEG. Here, in this embodiment, the image data refers to, for example, data representing an image in JPEG format, bitmap format, or the like. Furthermore, the image file refers to data that has been provided with information such as a file name and edited to a predetermined file format.

The transfer control unit 57 controls transfer of image data from the driver 50 to the application 40 using at least one of the first transfer control unit 54 and the second transfer control unit 51. Furthermore, the transfer control unit 57 gives a response to various commands defined in the TWAIN standard from the application 40. This response is given by controlling the first transfer control unit 54. Examples of the commands include a command that instructs to display a user interface unique to the data source (hereinafter, referred to as a "UI screen"), a command that requests image data read by the data source in a designated data transfer format, and the like.

Next, an example of the process flow in the driver 50 shown in FIG. 2 will be described with reference to FIG. 4. Here, a process that transfers image data scanned by the scanner 10 to the application 40 after the application 40 starts the driver 50 will be described.

The driver 50 is started due to an instruction from the application 40. After the start, the UI display control unit 52 of the driver 50 displays the dialog box 300 shown in FIG. 3 on the display device 22 (S101). Here, this display is performed based on a UI display request from the application 40.

Here, if the user presses a "scan" button in the dialog box 300 (S102), the mode selecting unit 58 of the driver 50 selects a transfer mode. Then, the file creation mode determining unit 55 of the driver 50 determines whether or not a file creation mode is set.

If the file creation mode determining unit 55 determines that the file creation mode is set (YES in S103), the image data acquiring unit 53 of the driver 50 requests compressed image data, and acquires compressed image data (for example, JPEG, etc.) from the scanner 10. Then, the acquired compressed image data is stored in a memory (S104).

Next, the image file creating unit 56 of the driver 50 creates an image file based on the acquired compressed image data, and stores the image file in the RAM 27 or the like (S105). Then, the second transfer control unit 51 of the driver 50 transfers the image file to the application 40 that has started the driver, using the file open function of the operating system 30 (S106). The application 40 that has received the image file receives file open notice from the operating system 30, and displays the image file as an image window on the display device 22 after the driver 50 has completely started (it may be while the driver is starting up).

Here, in the case where there are a plurality of original documents that are to be scanned, the driver 50 determines whether or not creation of all files is completed. If it is determined that the creation is not completed (NO in S107), the procedure returns to the process in S104. If the creation is completed (YES in S107), this process ends.

Furthermore, if it is determined in S103 that the file creation mode is not set (NO in S103), the driver 50 performs a conventional process (transfer according to the TWAIN). That is to say, the driver 50 notifies the application 40 that an instruction to start scanning is given via the data source manager 31 (S108). Accordingly, a TWAIN command (data transfer request) is directed from the application 40 to the driver 50 (S109). This TWAIN command contains information designating whether the data transfer method is a memory transfer method or a file transfer method.

Here, the image data acquiring unit 53 of the driver 50 requests non-compressed image data, and acquires non-compressed image data from the scanner 10. Then, the acquired non-compressed image data is stored in a memory (S110). Here, in the case where the TWAIN data transfer method is a memory transfer method, the first transfer control unit 54 of the driver 50 copies the acquired image data in the memory designated by the application 40. Accordingly, the driver 50 transfers the image data to the application 40 (S111). Next, the first transfer control unit 54 of the driver 50 performs a response process to the data transfer request from the application 40. More specifically, a response regarding a result of the memory transfer is given (S112). This response process is performed under the control of the transfer control unit 57.

Furthermore, in the case where the TWAIN data transfer method is a file transfer method, the first transfer control unit 54 of the driver 50 stores the image file with the file name designated by the application 40 in the auxiliary storage device 24 or the like. Accordingly, the driver 50 transfers the image data to the application 40 (S111). Then, the first transfer control unit 54 of the driver 50 performs a response process to the data transfer request from the application 40. More specifically, a response regarding a result of storing the image file is given (S112). This response process is performed under the control of the transfer control unit 57.

Next, in the case where there are a plurality of original documents that are to be scanned, the driver 50 determines whether or not transfer of all data is completed. If it is determined that the transfer is not completed (NO in S113), the procedure returns to the process in S110. If the transfer is completed (YES in S113), this process ends.

Figure 4:
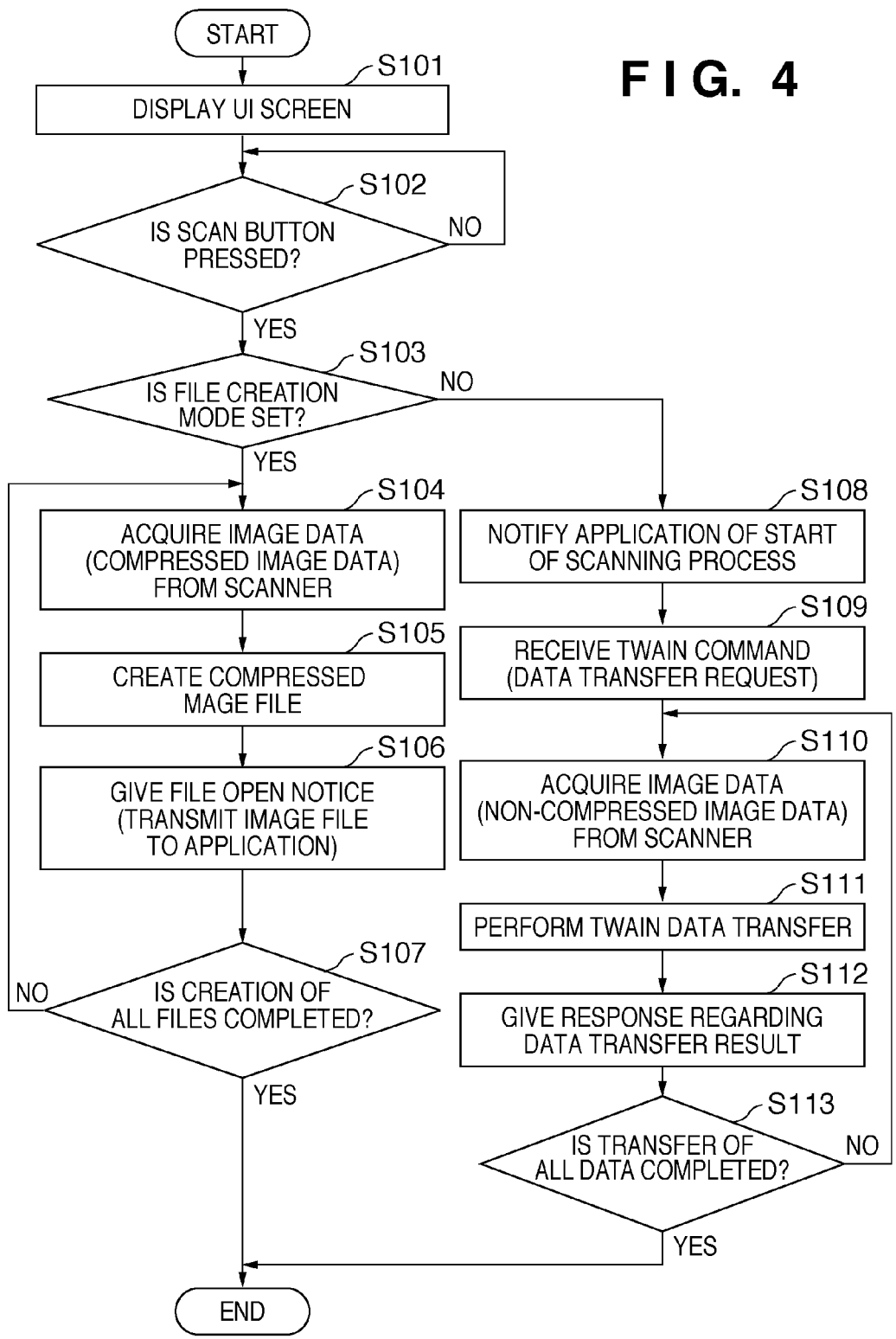
FIG. 4 is a flowchart showing an example of the process flow in a driver 50 shown in FIG. 2.

Here, in the description of FIG. 4, the file open function is used every time image data of one sheet is processed (S104 to S107), but there is no limitation to such a process. For example, the file open function may be used only once after image files are created based on all image data. Furthermore, in some applications, in the case where a plurality of image files are received with the file open function, image files may be displayed using a plurality of image windows. Accordingly, transfer may be performed using a multi-page file format, such as multi-TIFF, in order to improve the visibility for the user.

As described above, according to Embodiment 1, in the case where the file creation mode is set, image data is transferred to an application using the file open function of the operating system, without using TWAIN data transfer.

Accordingly, even in the case where data is transferred to the application 40 that does not support a file transfer method but supports a memory transfer method, if the file creation mode is set, image data can be transferred without causing deterioration of image quality. Furthermore, it is not necessary to create a file using another application or the like supporting the file transfer method as in conventional examples. Accordingly, image data can be transferred to the application 40 without deterioration of image quality or complicated operations.

Embodiment 2

Next, Embodiment 2 will be described. In Embodiment 2, the TWAIN data transfer method is determined in order to switch between use and non-use of the file open function of the operating system 30. Here, the configuration of the image scanning system in Embodiment 2 is similar to that in FIG. 1 described in Embodiment 1, and, thus, the description thereof is omitted in this embodiment, and only main points of difference will be described.

Hereinafter, an example of the process flow in the driver 50 according to Embodiment 2 will be described with reference to FIG. 5. Here, a process that transfers image data scanned by the scanner 10 to the application 40 after the application 40 starts the driver 50 will be described.

The driver 50 is started due to an instruction from the application 40. After the start, the UI display control unit 52 of the driver 50 displays the dialog box 300 shown in FIG. 3 on the display device 22 (S201). Here, this display is performed based on a UI display request from the application 40.

Here, if the user presses a "scan" button in the dialog box 300 (S202), the mode selecting unit 58 of the driver 50 selects a transfer mode. Then, the driver 50 notifies the application 40 that an instruction to start scanning has been given via the data source manager 31 (S203). Accordingly, a TWAIN command (data transfer request) is directed from the application 40 to the driver 50 (S204). This TWAIN command contains information designating whether the data transfer method is a memory transfer method or a file transfer method.

Here, the file creation mode determining unit 55 of the driver 50 determines whether or not a file creation mode is set. If it is determined that the file creation mode is not set (NO in S205), the image data acquiring unit 53 of the driver 50 requests non-compressed image data, and acquires non-compressed image data from the scanner 10. Then, the acquired non-compressed image data is stored in a memory (S216). Here, in the case where the TWAIN data transfer method is a memory transfer method, the first transfer control unit 54 of the driver 50 copies the acquired image data in the memory designated by the application 40. Accordingly, the driver 50 transfers the image data to the application 40 (S217). Next, the first transfer control unit 54 of the driver 50 performs a response process to the data transfer request from the application 40. More specifically, a response regarding a result of the memory transfer is given (S218). This response process is performed under the control of the transfer control unit 57.

Furthermore, in the case where the TWAIN data transfer method is a file transfer method, the first transfer control unit 54 of the driver 50 stores the image file with the file name designated by the application 40 in the auxiliary storage device 24 or the like. Accordingly, the driver 50 transfers the image data to the application 40 (S217). Then, the first transfer control unit 54 of the driver 50 performs a response process to the data transfer request from the application 40. More specifically, a response regarding a result of storing the image file is given (S218). This response process is performed under the control of the transfer control unit 57.

Next, in the case where there are a plurality of original documents that are to be scanned, the driver 50 determines whether or not transfer of all data is completed. If it is determined that the transfer is not completed (NO in S219), the procedure returns to the process in S216. If the transfer is completed (YES in S219), this process ends.

Furthermore, if it is determined in S205 that the file creation mode is set (YES in S205), the driver 50 determines the TWAIN data transfer method. If it is determined that the data transfer method is a file transfer method (YES in S206), the image data acquiring unit 53 of the driver 50 requests compressed image data, and acquires compressed image data (for example, JPEG, etc.) from the scanner 10. Then, the acquired compressed image data is stored in a memory (S207).

Here, the first transfer control unit 54 of the driver 50 stores the image file with the file name designated by the application 40 in the auxiliary storage device 24 or the like. Accordingly, the driver 50 transfers the image data to the application 40 (S208). Then, the first transfer control unit 54 of the driver 50 performs a response process to the data transfer request from the application 40. More specifically, a response regarding a result of storing the image file is given (S209). This response process is performed under the control of the transfer control unit 57.

Next, in the case where there are a plurality of original documents that are to be scanned, the driver 50 determines whether or not transfer of all data is completed. If it is determined that the transfer is not completed (NO in S210), the procedure returns to the process in S207. If the transfer is completed (YES in S210), this process ends.

Furthermore, in the case where it is determined in S206 that the data transfer method is a memory transfer method (NO in S206), the image data acquiring unit 53 of the driver 50 requests compressed image data, and acquires compressed image data (for example, JPEG, etc.) from the scanner 10. Then, the acquired compressed image data is stored in a memory (S211).

Next, the image file creating unit 56 of the driver 50 creates an image file based on the acquired compressed image data, and stores the image file in the RAM 27 or the like (S212). The second transfer control unit 51 of the driver 50 transfers the image file to the application 40 that has started the driver using the file open function of the operating system 30 (S213). The application 40 that has received the image file receives file open notice, and displays the image file as an image window on the display device 22 after the driver 50 has completely started (it may be while the driver is starting up).

Here, in the case where there are a plurality of original documents that are to be scanned, the driver 50 determines whether or not creation of all files is completed. If it is determined that the creation is not completed (NO in S214), the procedure returns to the process in S211. If the creation is completed (YES in S214), the first transfer control unit 54 of the driver 50 performs a response process to the data transfer request from the application 40 (S215). This response process is performed under the control of the transfer control unit 57.

Here, all image data scanned by the scanner 10 is transferred to the application 40 using the file open function of the operating system 30. Accordingly, there is no image data that is to be processed using the memory transfer method. Thus, the first transfer control unit 54 of the driver 50 gives a response of cancellation or error information as a result of the memory transfer. Accordingly, the TWAIN data transfer ends. This response process is performed under the control of the transfer control unit 57.

Here, information that the user wants (for example, information indicating the storage location of a file) may be created as image data and used as image data that is to be transferred using the memory transfer method. In some applications, if a response of cancellation or error information is given as a result of the memory transfer, an alert dialog box or an error dialog box may be uniquely displayed. Accordingly, in this configuration, for example, the application displays a dialog box shown in FIG. 6, and the user can easily find the storage location of an image file.

Figure 5:
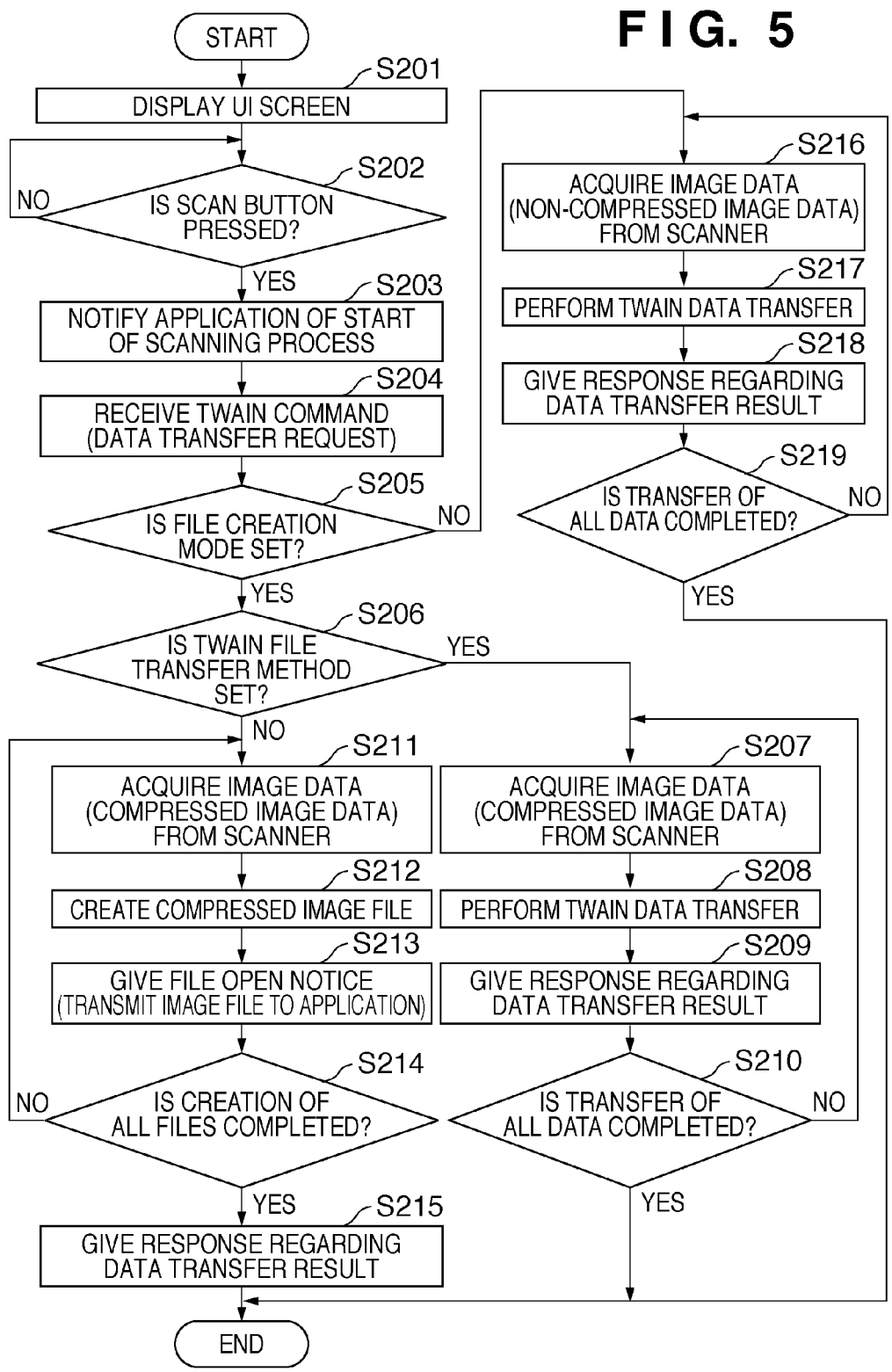
FIG. 5 is a flowchart showing an example of the process flow in the driver 50 according to Embodiment 2.

Furthermore, in the process shown in FIG. 5, the TWAIN data transfer method of the application 40 is determined, and the image data transfer processes are switched based on a result of the determination. However, in some applications, there may be a file format that does not support the file open function. Accordingly, the type of the application 40 may be determined in addition to the determination of the TWAIN data transfer method, and the transfer processes may be switched based on a result thereof.

As described above, according to Embodiment 2, in the case where the file creation mode is set, the TWAIN data transfer method is determined, and the transfer is switched between transfer using the TWAIN and transfer using the file open function.

The description above shows an example of typical embodiments of the present invention, but the present invention is not limited to the embodiments shown in the description above and the drawings, and modifications are possible as appropriate within a range not changing the gist thereof.

According the present invention, it is possible to avoid deterioration of image quality caused by a compression process or a decompression process, without complicated operations, when transferring image data to an application.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-124724 filed on May 22, 2009, which is hereby incorporated by reference herein in its entirety.

What is claimed is:

1. An information processing apparatus that acquires image data from an image supply apparatus, and that transfers the acquired image data to an application, comprising:

a selection unit configured to select a transfer mode when transferring the image data to the application;

a first transfer control unit configured to transfer the image data to the application according to a TWAIN standard;

a second transfer control unit configured to transfer an image file created based on the image data while maintaining a compression format or a non-compression format, to the application; and a transfer control unit configured to control the transfer using at least one of the first transfer control unit and the second transfer control unit based on the transfer mode selected by the selection unit, wherein the TWAIN standard has a plurality of transfer methods, the application transmits a data transfer request containing information designating any one of the plurality of transfer methods defined in the TWAIN standard, the transfer control unit controls the transfer based on the transfer mode selected by the selection unit and the transfer method designated by the application, the TWAIN standard has a memory transfer method that converts image data that is to be transferred into a non-compression format and transfers the image data, in a case where the image data is compressed, the transfer mode has a file creation mode that transfers an image file created based on the image data to the application, and the transfer control unit controls the transfer using the second transfer control unit, and gives a response to the data transfer request using the first transfer control unit, in a case where the application designates the memory transfer method, and where the selection unit selects the file creation mode.

2. The information processing apparatus according to claim 1, wherein the transfer mode has a file creation mode that transfers an image file created based on the image data to the application, and the transfer control unit controls the transfer using the second transfer control unit, in a case where the selection unit selects the file creation mode.

3. The information processing apparatus according to claim 1, further comprising:

a file creation unit configured to create an image file based on the image data while maintaining a compression format or a non-compression format;

wherein the second transfer control unit transfers the image file created by the file creation unit to the application using a file open function of an operating system.

4. The information processing apparatus according to claim 1, wherein the response to the data transfer request is cancellation or error information on transfer using the memory transfer method.

5. The information processing apparatus according to claim 1, wherein the transfer control unit controls the transfer using the second transfer control unit, and transfers image data representing an image indicating a storage location of the image file transferred using the second transfer control unit, to the application using the first transfer control unit according to the memory transfer method, in a case where the application designates the memory transfer method, and where the selection unit selects the file creation mode.

6. The information processing apparatus according to claim 1, further comprising an acquisition unit configured to acquire the image data from the image supply apparatus while designating compression and non-compression of the image data.

7. A processing method of an information processing apparatus that acquires image data from an image supply apparatus, and that transfers the acquired image data to an application, comprising:
   selecting a transfer mode when transferring the image data to the application using a selection unit;
   transferring the image data to the application according to a TWAIN standard using a first transfer control unit;
   transferring an image file created based on the image data while maintaining a compression format or a non-compression format, to the application using a second transfer control unit; and
   controlling the transfer using at least one of the first transfer control unit and the second transfer control unit based on the transfer mode selected by the selection unit, using a transfer control unit,
   wherein the TWAIN standard has a plurality of transfer methods,
   the application transmits a data transfer request containing information designating any one of the plurality of transfer methods defined in the TWAIN standard,
   the controlling controls the transfer based on the transfer mode selected in the selecting and the transfer method designated by the application,
   the TWAIN standard has a memory transfer method that converts image data that is to be transferred into a non-compression format and transfers the image data, in a case where the image data is compressed,
   the transfer mode has a file creation mode that transfers an image file created based on the image data to the application, and
   the controlling controls the transfer using the second transfer control unit, and gives a response to the data transfer request using the first transfer control unit, in a case where the application designates the memory transfer method, and where the selecting selects the file creation mode.

8. The processing method according to claim 7,
   wherein the transfer mode has a file creation mode that transfers an image file created based on the image data to the application, and
   the controlling controls the transfer using the second transfer control unit, in a case where the selecting selects the file creation mode.

9. The processing method according to claim 7, further comprising:
   creating an image file based on the image data while maintaining a compression format or a non-compression format,
   wherein the second transfer control unit transfers the image file created by the file creation unit to the application using a file open function of an operating system.

10. The processing method according to claim 7, wherein the response to the data transfer request is cancellation or error information on transfer using the memory transfer method.

11. The processing method according to claim 7,
    wherein the controlling controls the transfer using the second transfer control unit, and transfers image data representing an image indicating a storage location of the image file transferred using the second transfer control unit, to the application using the first transfer control unit according to the memory transfer method, in a case where the application designates the memory transfer method, and where the selecting selects the file creation mode.

12. The processing method according to claim 7, further comprising acquiring the image data from the image supply apparatus while designating compression and non-compression of the image data.

13. A non-transitory computer-readable storage medium storing a computer program for causing a computer included in an information processing apparatus that acquires image data from an image supply apparatus, and that transfers the acquired image data to an application, to function as:
    a selection unit configured to select a transfer mode when transferring the image data to the application;
    a first transfer control unit configured to transfer the image data to the application according to a TWAIN standard;
    a second transfer control unit configured to transfer an image file created based on the image data while maintaining a compression format or a non-compression format, to the application; and
    a transfer control unit configured to control the transfer using at least one of the first transfer control unit and the second transfer control unit based on the transfer mode selected by the selection unit,
    wherein the TWAIN standard has a plurality of transfer methods,
    the application transmits a data transfer request containing information designating any one of the plurality of transfer methods defined in the TWAIN standard,
    the transfer control unit controls the transfer based on the transfer mode selected by the selection unit and the transfer method designated by the application,
    the TWAIN standard has a memory transfer method that converts image data that is to be transferred into a non-compression format and transfers the image data, in a case where the image data is compressed,
    the transfer mode has a file creation mode that transfers an image file created based on the image data to the application, and
    the transfer control unit controls the transfer using the second transfer control unit, and gives a response to the data transfer request using the first transfer control unit, in a case where the application designates the memory transfer method, and where the selection unit selects the file creation mode.

14. The non-transitory computer-readable storage medium processing method according to claim 13,
    wherein the transfer mode has a file creation mode that transfers an image file created based on the image data to the application, and
    the transfer control unit controls the transfer using the second transfer control unit, in a case where the selection unit selects the file creation mode.

15. The non-transitory computer-readable storage medium according to claim 13, wherein the computer program further causes the computer to function as:
    a file creation unit configured to create an image file based on the image data while maintaining a compression format or a non-compression format;

wherein the second transfer control unit transfers the image file created by the file creation unit to the application using a file open function of an operating system.

16. The non-transitory computer-readable storage medium according to claim 13, wherein the response to the data transfer request is cancellation or error information on transfer using the memory transfer method.

17. The non-transitory computer-readable storage medium according to claim 13, wherein the transfer control unit controls the transfer using the second transfer control unit, and transfers image data representing an image indicating a storage location of the image file transferred using the second transfer control unit, to the application using the first transfer control unit according to the memory transfer method, in a case where the application designates the memory transfer method, and where the selection unit selects the file creation mode.

18. The non-transitory computer-readable storage medium according to claim 13, wherein the computer program further causes the computer to function as an acquisition unit configured to acquire the image data from the image supply apparatus while designating compression and non-compression of the image data.

* * * * *